(12) United States Patent
Fervel et al.

(10) Patent No.: US 8,740,155 B2
(45) Date of Patent: Jun. 3, 2014

(54) MORE ELECTRIC FLIGHT CONTROL SYSTEM ONBOARD AN AIRCRAFT

(75) Inventors: Marc Fervel, Toulouse (FR); Alexandre Gentilhomme, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 210 days.

(21) Appl. No.: 12/651,603

(22) Filed: Jan. 4, 2010

(65) Prior Publication Data

US 2010/0170999 A1  Jul. 8, 2010

(30) Foreign Application Priority Data

Jan. 8, 2009 (FR) ................................ 09 50081

(51) Int. Cl.
*B64C 13/40* (2006.01)
*B64C 13/00* (2006.01)

(52) U.S. Cl.
CPC ........... *B64C 13/00* (2013.01); *B64C 2700/626* (2013.01); *B64C 2700/6257* (2013.01)
USPC ....................................................... 244/227

(58) Field of Classification Search
CPC ............. B64C 13/00; B64C 2700/626; B64C 2700/6257; Y02T 50/545
USPC .......................... 244/58, 99.5, 99.6, 226–228
See application file for complete search history.

(56) References Cited

U.S. PATENT DOCUMENTS

| | | | |
|---|---|---|---|
| 3,710,218 A | 1/1973 | Roundy et al. | |
| 4,649,484 A * | 3/1987 | Herzog et al. | 701/3 |
| 4,994,684 A * | 2/1991 | Lauw et al. | 290/52 |
| 5,054,713 A * | 10/1991 | Langley et al. | 244/12.2 |
| 5,310,315 A * | 5/1994 | Lafortune et al. | 416/114 |
| 7,182,583 B2 * | 2/2007 | Gandrud et al. | 417/371 |
| 2006/0044722 A1 | 3/2006 | Wavering et al. | |

OTHER PUBLICATIONS

Lester Faleiro, "Beyond the More Electric Aircraft", Aerospace America, vol. 47, No. 6, XP002541982, Jun. 5, 2005, pp. 35-40.
U.S. Appl. No. 13/255,778, filed Sep. 9, 2011, Fervel, et al.
U.S. Appl. No. 13/255,406, filed Sep. 8, 2011, Fervel, et al.

* cited by examiner

*Primary Examiner* — Valentina Xavier
(74) *Attorney, Agent, or Firm* — Oblon, Spivak, McClelland, Maier & Neustadt, L.L.P.

(57) ABSTRACT

An electric flight control system onboard an aircraft provided with flight control surfaces and controllers for controlling these surfaces, that include at least one local electro-hydraulic generator to supply hydraulic servocontrols connected to flight control surfaces.

11 Claims, 3 Drawing Sheets

MORE ELECTRIC FLIGHT CONTROL SYSTEM ONBOARD AN AIRCRAFT

TECHNICAL FIELD

The invention relates to a more electric flight control system onboard an aircraft, for example an airplane.

For example, the following description considers the example of an airplane to simplify the description.

STATE OF PRIOR ART

Flight control architectures used on current passenger aircraft are based on concepts of two or three hydraulic circuits and at least two electrical circuits. The following technologies are used on these architectures in priority when two actuators are connected to the same flight control surface:
- a hydraulic servocontrol associated with an electro-hydrostatic actuator (EHA), or
- two electrical backup hydraulic actuators (EBHA).

A hydraulic servocontrol is a standard actuator connected to the central hydraulic system of the aircraft through pipes from the aircraft hydraulic rack. It comprises a servovalve that directs the hydraulic pressure supplied by aircraft hydraulic pumps, to move the pin of the actuator connected to a corresponding control surface, for example an aileron, an elevator, a rudder or a spoiler. An electro-hydrostatic actuator (EHA) is connected to the aircraft electrical network. It is provided with an independent electrical hydraulic pump, a tank and an accumulator that generates the hydraulic power necessary to move said pin. Therefore, this actuator is a hydraulic actuator because the power used to move the pin is hydraulic. However, since the hydraulic system is independent, all that it needs to function is electrical energy from the aircraft electrical network.

An electrical backup hydraulic actuator (EBHA) is a hybrid actuator that uses electrical and hydraulic powers. It is a combination of a electro-hydrostatic actuator and a standard hydraulic actuator. It is connected both to the central hydraulic system and to the electrical system. The main power source is output by fluid lines of a hydraulic system. It comprises a local electric motor and a two-way pump. In the case of a fault in the central hydraulic system, the local electric motor and the pump are switched by electrical signals onto a distributed control line to supply and control the actuator in the same way as an electro-hydrostatic actuator.

Thus, a flight control architecture can use the following power generation means:

Hydraulic Generation

The hydraulic generation principle used on aircraft to generate the hydraulic power of two or three circuits is to use hydro-mechanical pumps connected directly to the accessories box (reduction gear) provided on each motor. In the case of a flight control architecture with three hydraulic circuits, the third hydraulic circuit is supplied nominally either by an electro-hydraulic pump or by a hydro-mechanical pump.

Electro-hydraulic Generation

Two different technical solutions are used to supply power to electro-hydraulic pumps or that could potentially be activated in flight:
- either through a generator supplying a three-phase AC voltage at fixed frequency and constant rms value,
- or from an electrical busbar providing a DC voltage. In this case, power electronics are necessary to control the power supply for the phases of the electric motor driving the pump.

Electro-hydraulic pumps powered by a three-phase AC voltage at variable frequency and constant rms value using no power electronics are only used for generating auxiliary hydraulics when the aircraft is on the ground.

Electrical Generation for Flight Control Actuators

Flight control electrical actuators are powered using different technological solutions:
- either by a three-phase AC voltage at fixed frequency and constant rms value,
- or by a three-phase AC voltage at variable frequency and constant rms value.

In both cases, the rotation speed of the actuator electric motor is controlled by the use of local power electronics.

The architecture of flight controls shown in FIG. 1 illustrates the principle of subscribing to energies on flight control actuators of an aircraft according to prior art. This figure shows wings 10 and 11 with:
- ailerons 12, 13,
- spoilers 14, 15
- slats 16
- flats 17 forming speed reducers (spoilers on the ground) 18 and roll surfaces 19,
- a Trimmable Horizontal Stabiliser Actuator THSA 20,
- elevators 21 and 22,
- a vertical stabiliser 23 comprising an upper rudder 24 and an lower rudder 25.

The legend also shows:
- electric motors 60,
- standard hydraulic servocontrols 61,
- electro-hydrostatic actuators (EHA) 62,
- electrical backup hydraulic actuators (EBHA) 63.

"G" ("green") corresponds to the green hydraulic system.
"Y" ("yellow") corresponds to the yellow hydraulic system.
"B" ("blue") corresponds to the blue hydraulic system.

The term "E1" corresponds to the AC power E1. The term "E2" corresponds to the AC power E2. The term "E3" corresponds to the AC power E3.

Only the third pair of ailerons 12 (O/B) is actuated through hydraulic servocontrols.

Aircraft designers are faced with the following technical problems:

Carbon Structure and Thinner Wings

The use of carbon as a structural material results in a lower thermal transfer rate with the actuator than a metallic structure. Thus, an actuator placed in such an environment is not as well cooled, which may make it necessary to consider the use of additional cooling devices. Existing electrical actuators tend to be larger than hydraulic servocontrols for equivalent general functions and characteristics, due to the presence of electric motors, equipment to transform the rotation movement into a translation movement and the power electronics that also need cooling. Therefore the thinner wings and carbon structure are doubly restrictive in terms of:
- confinement that can lead to integration difficulties,
- heat transfer with the structure (less than with a metallic structure) that may necessitate additional cooling devices.

Reduction of the System Mass

At flight controls, generation elements (pumps, tanks, headers, suction lines, pressurisation lines, connections, etc.) have an important influence in the global mass balance of existing architectures.

Simplification of the System Installation and Maintenance

In general, maintenance of equipment in the fuselage area is easier than operation in the wing area, and more particularly on the rudder or stabiliser in the high position. Furthermore, the cost of an electrical actuator with similar functions is very much higher than the cost of a hydraulic servocontrol.

The following factors need to be taken into account to achieve such simplification:

Installation of Hydraulic Systems

The installation of hydraulic pipes on an aircraft is a difficult and expensive task due to:
precise alignments of connectors to be respected,
layout rules to be respected relative to other systems (protection),
tests for verification of leak tightness to be done.

Maintenance of Hydraulic Systems

Long operations are necessary for maintenance of a hydraulic system for which the hydraulic system needs to be open, such that the aircraft has to be immobilised for a long period which is expensive, due to the need to:
isolate the open circuit,
protect other systems against any contact with the fluid,
repressurise and purge after the work,
leak tightness verification tests.

Improve System Reliability

The following factors need to be taken into account to improve system reliability:

Reliability of Power Electronics

The following thermal constraints are the major factors involved in reducing the reliability of power electronics:
the temperature that must be managed, particularly for high powers,
the number of thermal cycles related to aircraft usage cycles, that lead to mechanical constraints on electronic elements,
vibrations and shocks.

The use of a short haul civil aircraft requires a high rotation rate, that has the consequence of multiplying the number of thermal cycles and vibrations or shocks applied to power electronics during landing. Therefore, the use of a short haul aircraft has significant consequences on the reliability of power electronics, particularly when considering electronics located in a severe environment (the case for example of electrical flight control actuators), and consequently increase the frequency of maintenance operations.

Reliability of Electro-mechanical Actuators

Apart from the fact that they use power electronics for which reliability problems have already been mentioned, existing electro-mechanical actuator technologies also introduce higher risks of seizure than hydraulic servocontrols due to the use of devices to transform the rotation movement (electric motor) into a translation movement. Thus, for actuators that are critical related to a seizure failure, additional devices have to be used to reduce such a risk, and they have a significant impact on the volume, mass and cost of the actuator.

The purpose of the invention is to solve these various problems by proposing a more electric flight control system using local electro-hydraulic generation to power hydraulic servocontrols in replacement of electrical actuators.

PRESENTATION OF THE INVENTION

This invention relates to a more electric flight control system onboard an aircraft provided with flight control surfaces and means of controlling these surfaces, that comprises at least one local electro-hydraulic generator to supply hydraulic servocontrols connected to flight control surfaces, characterised in that each local electro-hydraulic generator comprises an electric motor that is an induction motor powered by a fixed frequency AC voltage with a constant rms value so as to operate at a constant speed.

In a first embodiment, the flight control surfaces connected to servocontrols powered by at least one electro-hydraulic generator comprise elevators and rudders. The system can then comprise two hydraulic generators advantageously located in the aft part of the aircraft in a zone that is not likely to be affected by an engine explosion or a tyre burst.

In a second embodiment, these surfaces comprise surfaces located on the wing (wing control surface) and particularly ailerons and/or spoilers. The system may then comprise two hydraulic generators advantageously located in the central part of the aircraft in a zone that is not likely to be affected by an engine explosion or a tyre burst.

In a third embodiment, these surfaces comprise wing control surfaces, elevators and rudders. The system may then comprise two hydraulic generators advantageously located in the aft or central part of the aircraft.

Advantageously, the system according to the invention comprises a community of power electronics leading to a single electronic module to supply hydraulic generation motors, this electronic module advantageously being housed in a pressurised zone.

The system according to the invention has many advantages, and particularly:
a reduction in the occurrence of the power electronic failures,
a reduction in maintenance operations in the wing zone and/or in the vertical stabiliser and/or in the horizontal stabiliser,
optimise maintenance costs.

DETAILED PRESENTATION OF PARTICULAR EMBODIMENTS

The system according to the invention consists of using at least one local electro-hydraulic generator (HPP) to supply hydraulic servocontrols connected to flight control surfaces, to replace electrical actuators in a more electric flight control architecture.

Figure 1:
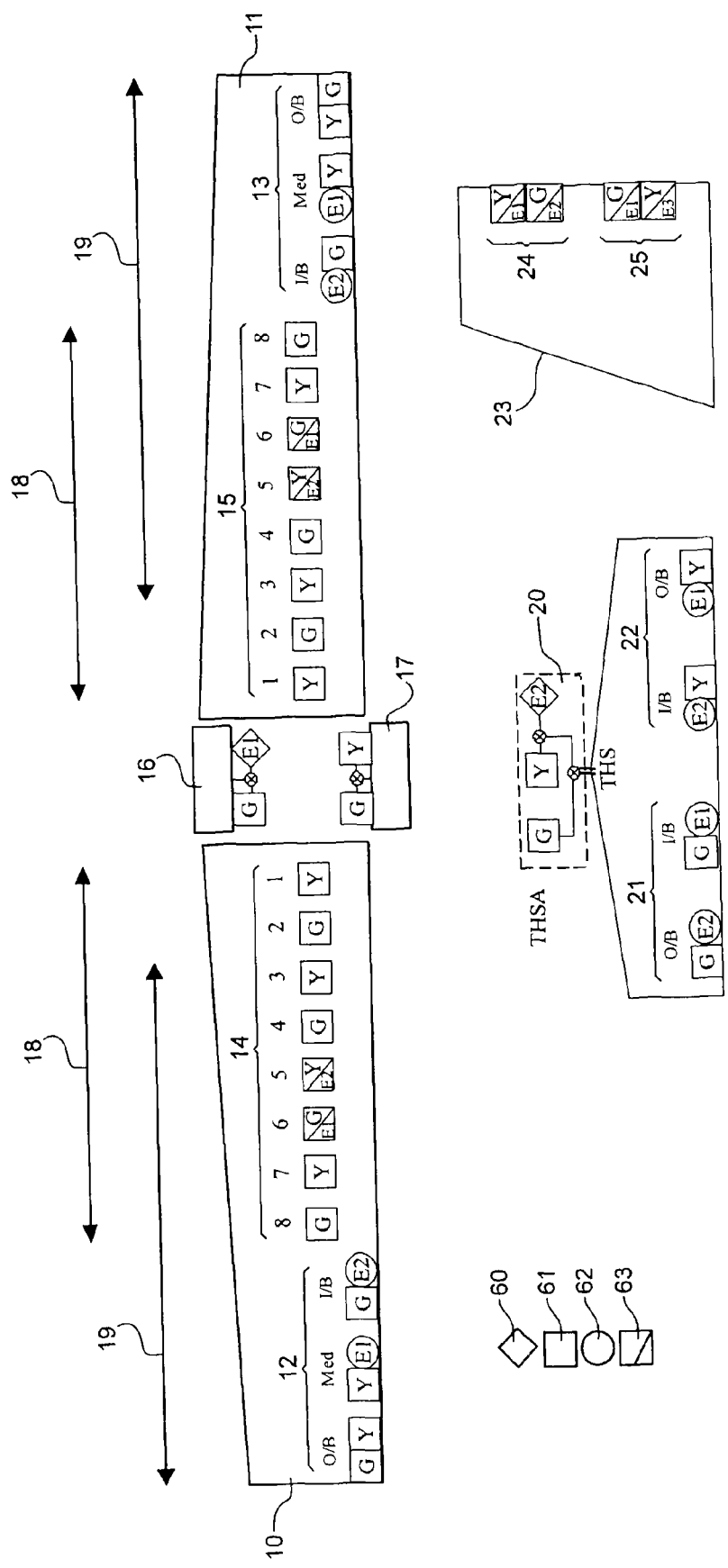
FIG. 1 shows the architecture of a flight control on an aircraft according to prior art.
Figure 2A:
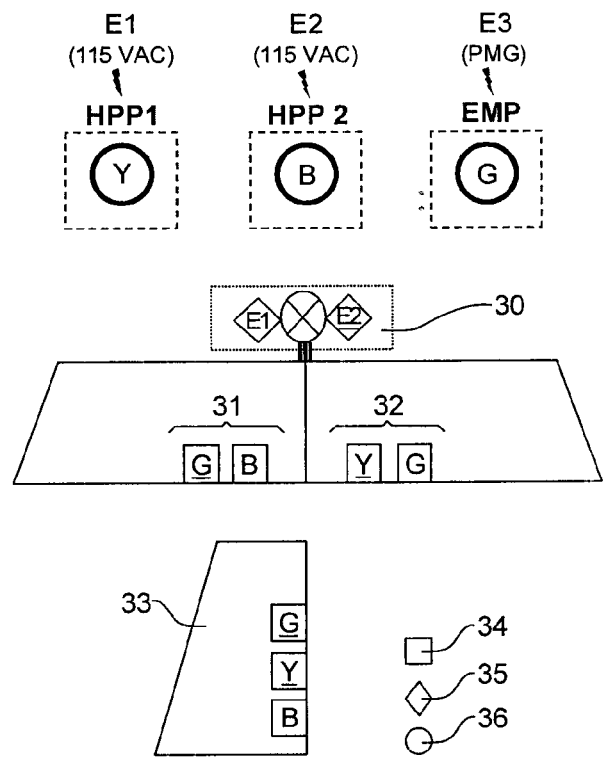
FIG. 2A shows a first embodiment of the system according to the invention, FIG. 2B showing an embodiment corresponding to known art.

In a first embodiment shown in FIG. 2A, the system according to the invention comprises two electro-hydraulic generators HPP1 and HPP2 housed in the aft part of the aircraft, to supply second line hydraulic servocontrols on the elevators 31 and 32 and the rudder 33. The electric motors for these hydraulic generators are induction motors supplied at an AC voltage with a fixed frequency and a constant rms value (CV/FF). The motors thus powered operate at a constant rotation speed. They do not need any power electronics except if this type of voltage is not available on the aircraft.

FIG. 2A thus shows the principle schematic for the use of local hydraulic generations for a tail fin. We thus have:
two local hydraulic generations HPP1 and HPP2,
one central hydraulic circuit (electric motor driven pump EMP),
an induction motor for each local hydraulic generation, a power supply:
  at alternating voltage (VAC) at fixed frequency if available on the aircraft, or otherwise
  with the use of power electronics.
This type of use can improve direct maintenance costs:
potentiality of not using the power electronics for local hydraulic generations HPP1 and HPP2,
possibility of duplicating the power electronics to these local hydraulic generations HPP1 and HPP2,
elimination of electro-hydrostatic actuators.
FIG. 2A also shows:
a trimmable horizontal stabiliser actuator (THSA) 30,
elevators 31 and 32,
a rudder 33,
with the following in the legend:
servocontrols 34,
electric motors 35,
hydraulic generators 36.

Figure 2B:
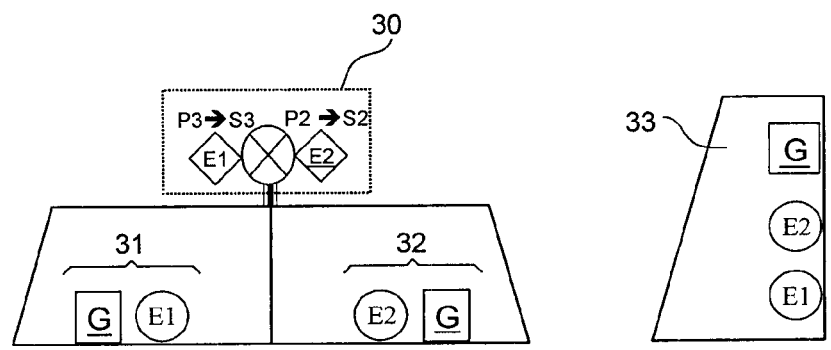

FIG. 2B shows a reminder of the initial principle with the same references as in FIG. 2A.

The system according to the invention can thus increase the common use of power electronics originally distributed on electrical actuators to a single module to supply power to electro-hydraulic generation motors. This electronic module may be located in a more accessible fuselage zone in a more propitious environment: pressurised and air conditioned thus improving the reliability of the hydraulic generation+actuator assembly. The system according to the invention also enables increased common use of electro-hydraulic generation equipment originally distributed on the electrical actuators.

The system according to the invention thus has the following advantages:
reduction in the occurrence of power electronic failures and failures and electro-hydraulic generation equipment,
location of generation equipment in the more accessible fuselage zone and therefore a smaller number of maintenance operations in the wing zone,
optimised location of hydraulic generation equipment by bringing it closer to tanks and to hydraulic distribution equipment,
significant reduction in lengths and consequently diameters of large hydraulic pipes: intake, case-drain and supply,
elimination of all hydraulic equipment installations in the motor zone,
optimisation of maintenance costs.

In a second embodiment of the system according to the invention, it comprises two electro-hydraulic generators that power servocontrols connected to surfaces located on the wing, for example ailerons 44 and 45 and/or spoilers 42 and 43.

Figure 3:
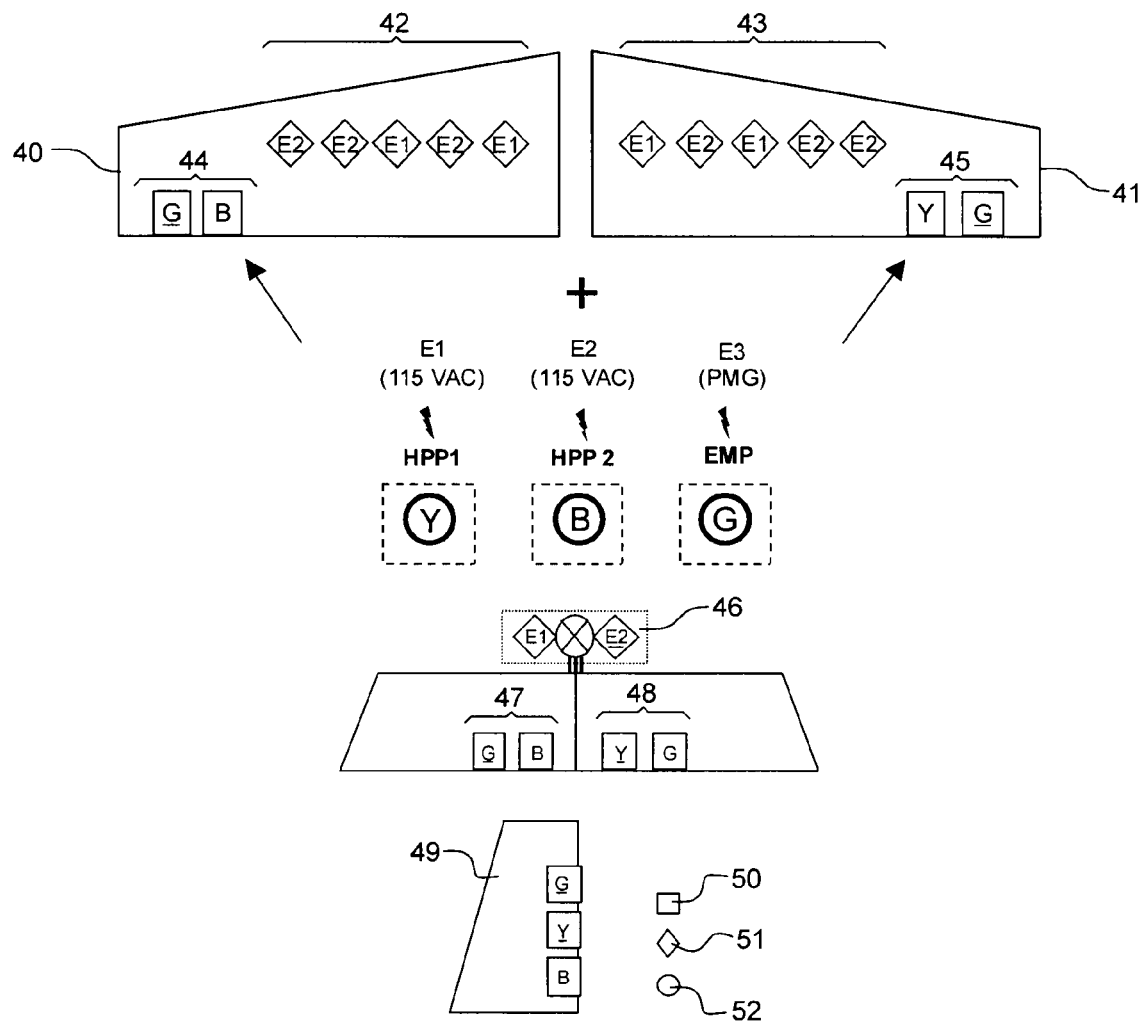
FIG. 3 shows a third embodiment of the system according to the invention.

FIG. 3 shows a third embodiment of the system according to the invention, the electro-hydraulic generation being used to control the tail fin 31, 32, 33 and the ailerons 44, 45. This third embodiment is based on the same approach as the first embodiment, extending the concept of replacing electro-hydrostatic actuators by servocontrols to all electro-hydrostatic actuators located in the initial architecture. We thus have:
two local hydraulic generations HPP1 and HPP2,
one central hydraulic circuit EMP,
one induction motor for each local hydraulic generation,
a power supply:
  at fixed frequency alternating voltage if available on the aircraft, or otherwise
  with the use of power electronics.

The extension to ailerons can improve direct maintenance costs due to the elimination of electro-hydrostatic actuators (EHA).

This FIG. 3 also shows wings 40 and 41, and:
spoilers 1 to 5, 42 and 43,
ailerons 44 and 45,
a trimmable horizontal stabiliser actuator (THSA) 46,
elevators 47 and 48,
a rudder 49

The legend also shows:
servocontrols 50,
electric motors 51,
hydraulic generators 52.

This third embodiment has the same advantages as the first embodiment listed above.

The invention claimed is:

1. An electric flight control system for an aircraft provided with flight control surfaces, said system comprising:
   at least one local electro-hydraulic generator to supply, from within a fuselage of the aircraft, hydraulic servocontrols located outside the fuselage and connected to flight control surfaces;
   a trimmable horizontal stabilizer actuator (THSA) including at least one electric motor; and
   an electronic module that commonly supplies power to each of the at least one local electro-hydraulic generator and to each of the at least one electric motor, wherein
   each local electro-hydraulic generator is provided with a fixed frequency AC voltage with a constant rms, and comprises at least one electric motor which is an induction motor powered by said fixed frequency AC voltage with said constant rms value and configured to operate at a constant speed, and
   the hydraulic servocontrols powered by the at least one electro-hydraulic generator from within the fuselage of the aircraft are located on at least one of a wing, an elevator, or a rudder of the aircraft.

2. The system according to claim 1, comprising at least two electro-hydraulic generators located in an aft part of the fuselage of the aircraft.

3. The system according to claim 1, wherein the flight control surfaces connected to the hydraulic servocontrols powered by the at least one electro-hydraulic generator comprise elevators and rudders.

4. The system according to claim 3, wherein said flight control surfaces comprise a horizontal stabiliser.

5. The system according to claim 1, wherein the flight control surfaces connected to the hydraulic servocontrols powered by the at least one electro-hydraulic generator comprise surfaces located on a wing of said aircraft.

6. The system according to claim 5, wherein said surfaces located on the wing comprise ailerons and/or spoilers.

7. The system according to claim 1, wherein said electronic module is housed in a pressurised zone.

8. An aircraft comprising a system according to claim 1.

9. The system according to claim 1, wherein said hydraulic servocontrols include servovalves that direct hydraulic pressure supplied via the at least one local electro-hydraulic generator to move pins of actuators connected to the flight control surfaces.

10. The system according to claim 1, wherein the flight control surfaces are not connected to an electro-hydrostatic actuator.

11. The system according to claim 1, wherein the electronic module is located within the fuselage of the aircraft.

* * * * *